United States Patent [19]

Satake et al.

[11] Patent Number: 5,391,645

[45] Date of Patent: * Feb. 21, 1995

[54] POLY(ARYLENE THIOETHER-KETONE) COPOLYMER AND PRODUCTION PROCESS THEREOF

[75] Inventors: Yoshikatsu Satake; Yoshiyuki Inaguma; Yasuhiro Suzuki, all of Iwaki, Japan

[73] Assignee: Kureha Kagaku Kogyo K.K., Tokyo, Japan

[ * ] Notice: The portion of the term of this patent subsequent to Oct. 6, 2009 has been disclaimed.

[21] Appl. No.: 63,822

[22] Filed: May 20, 1993

Related U.S. Application Data

[62] Division of Ser. No. 686,978, Apr. 18, 1991, Pat. No. 5,288,815.

[30] Foreign Application Priority Data

Apr. 25, 1990 [JP] Japan ................... 2-109481
Mar. 8, 1991 [JP] Japan ................... 3-067554

[51] Int. Cl.$^6$ .............................................. C08K 5/35
[52] U.S. Cl. ................................... 525/471; 525/537; 528/388
[58] Field of Search ............... 525/471, 537; 528/388

[56] References Cited

U.S. PATENT DOCUMENTS

| | | | |
|---|---|---|---|
| 3,919,177 | 11/1975 | Campbell . | |
| 4,960,806 | 10/1990 | Satake et al. | 524/100 |
| 4,962,143 | 10/1990 | Satake et al. | 524/100 |
| 4,975,479 | 12/1990 | Satake et al. | 524/100 |
| 5,153,264 | 10/1992 | Satake et al. | 528/388 |
| 5,153,279 | 10/1992 | Satake et al. | 525/537 |

FOREIGN PATENT DOCUMENTS

| | | |
|---|---|---|
| 57-22938 | 2/1982 | Japan . |
| 5100 | 2/1984 | Japan . |
| 60-58435 | 4/1985 | Japan . |
| 60-104126 | 6/1985 | Japan . |
| 60-120720 | 6/1985 | Japan . |
| 61-20017 | 1/1986 | Japan . |
| 200127 | 6/1986 | Japan . |
| 61-197634 | 9/1986 | Japan . |
| 62-27434 | 2/1987 | Japan . |
| 64-124 | 1/1989 | Japan . |

OTHER PUBLICATIONS

*Polymer*, 21, 577 (1980).

*Primary Examiner*—Melvyn I. Marquis
*Assistant Examiner*—Helen F. Lee
*Attorney, Agent, or Firm*—Lowe, Price, LeBlanc & Becker

[57] ABSTRACT

Disclosed herein are a poly(arylene thioether-ketone) copolymer comprising (A) at least one poly(arylene thioether-ketone) segment having predominant recurring units of the formula

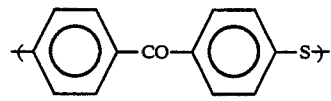

wherein the —CO— and —S— are in the para position to each other, and (B) at least one poly(arylene thioether) segment having predominant recurring units of the formula

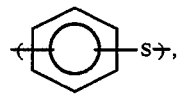

(a) the ratio of the total amount of the poly(arylene thioether) segment (B) to the total amount of the poly(arylene thioether-ketone) segment (A) ranging from 0.05 to 5 by weight, (b) the number-average polymerization degree of the poly(arylene thioether) segment (B) being higher than 1 but lower than 10, and (c) said copolymer having a melt viscosity of 2–100,000 poises as measured at 350° C. and a shear rate of 1,200/sec as well as a production process of the poly(arylene thioether-ketone) copolymer.

6 Claims, No Drawings

POLY(ARYLENE THIOETHER-KETONE) COPOLYMER AND PRODUCTION PROCESS THEREOF

This application is a division of application Ser. No. 07/686,978, filed Apr. 8, 1991, now U.S. Pat. No. 5,288,815.

FIELD OF THE INVENTION

This invention relates to crystalline poly(arylene thioether-ketone) copolymers uniform in composition and excellent in heat resistance, melt stability, processability and handling properties, and more specifically to novel copolymers containing at least one poly(arylene thioether-ketone) segment [hereinafter abbreviated as "PTK segment (A)" or merely "segment (A)"] having predominant recurring units of the formula

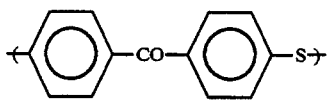

and at least one poly(arylene thioether) segment [hereinafter abbreviated as "PATE segment (B)" or merely "segment (B)"] having predominant recurring units of the formula

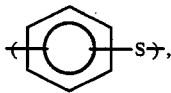

and also to a process for the production thereof.

This invention is also concerned with a process for economically producing crystalline aromatic ketone copolymers by using inexpensive comonomers and polymerization solvent.

BACKGROUND OF THE INVENTION

In the fields of the electronic and electrical industry and the automobile, aircraft and space industries, there is a strong demand in recent years for crystalline thermoplastic resins having high heat resistance of about 300° C. or higher in terms of melting point and moreover easy melt processability. Polyether ketones having predominant recurring units of the following structural formula [I] or [II]:

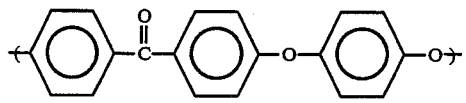

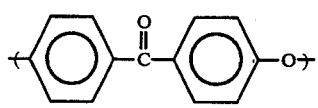

were discussed [Polymer, 21, 577 (1980)].

These polyether ketones have excellent heat resistance and mechanical strength. However, they use expensive fluorine-containing monomers and utilize, as a solvent, an aromatic sulfone which is costly upon its separation and purification from the resulting polymers. Their production process thus involves many disadvantages in its industrial use (Japanese Patent Publication No. 22938/1982).

Besides, as poly(arylene thioether-ketone) type polymers, there have been proposed polymers having predominant recurring units of the following structural formula [III], [IV], [V] or [VI]:

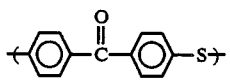

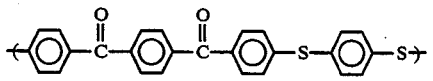

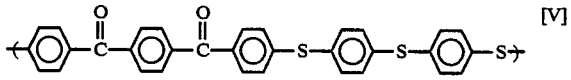

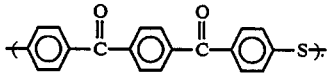

The poly(arylene thioether-ketones) (hereinafter abbreviated as "PTKs") having the predominant recurring units of the structural formula [III] have excellent heat resistance, but involve a problem that they have poor heat stability upon melting (hereinafter called "melt stability") (Japanese Patent Laid-Open Nos. 58435/1985 and 124/1989). The polymers having the predominant recurring units of the structural formulae [IV] and [V], respectively, are not suitable for industrial production because they must use particular polymerization solvents and monomers (Japanese Patent Laid-Open Nos. 200127/1986, 197634/1986 and 27434/1987). The poly(arylene thioether ketone ketones) (hereinafter abbreviated as "PTKKs") having the predominant recurring units of the structural formula [VI] have a melting point as extremely high as about 410° C. Their melt processing temperature are high accordingly, so that they tend to loss their crystallinity or to undergo crosslinking and/or carbonization, resulting in a rapid increase in melt viscosity, upon their melt processing.

In addition, since PTKs and PTKKs contain ketone groups in their recurring units, they are poor in solvent resistance and moisture absorption resistance, so that their application fields as heat-resistant resins are unavoidably limited. PTKs and PTKKs are generally obtained as fine powders. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

On the other hand, for example, poly(p-phenylene thioether) as a poly(arylene thioether) (hereinafter abbreviated as "PATE") is used as high-performance engineering plastics having excellent heat resistance and solvent resistance. This polymer is obtained by reacting dichlorobenzene, which is very cheap and industrially available, with sodium sulfide (U.S. Patent Specification No. 3,919,177). However, its crystalline melting point is about 285° C. and its glass transition point (Tg) is also as low as about 85° C. There is thus a demand for development of polymers having a higher melting point and a higher Tg.

In order to solve the above problem, there has also been proposed copolymers in which arylene thioether units and sulfone units of the formula

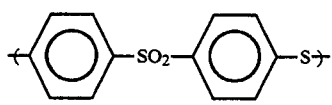

and/or ketone units of the formula

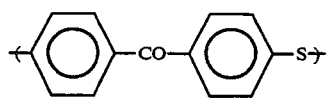

are introduced at random therein (Japanese Patent Publication No. 5100/1984).

It is however impossible to obtain polymers having satisfactory uniformity in composition, heat resistance and/or melt stability by the prior art process in which a dihalobenzene and a dihalogenated aromatic compound activated by the ketone group or sulfone group are reacted together with an alkali metal sulfide in a polar organic solvent to copolymerize them, because their reactivity and chemical stability in a polymerization system are different from each other. Namely, the resultant random copolymers tend to have lower crystallinity and poorer heat resistance and mechanical properties as the proportion of the arylene thioether units decreases, in particular, to 90 mole % or less.

It has been proposed to react an aromatic thioether with phosgene or an aromatic dicarboxylic acid dihalide in the presence of a Lewis acid in a non-polar solvent, thereby obtaining polymers having respective predominant recurring units of the following structural formulae [VII] and [VIII] (Japanese Patent Laid-Open Nos. 104126/1985 and 120720/1985):

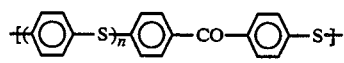  [VII]

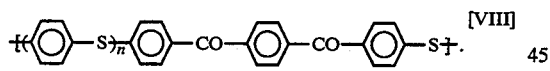  [VIII]

However, the resulting polymers were accompanied by problems that they had a low degree of polymerization and poor melt stability, and undergo gelation easily.

OBJECTS AND SUMMARY OF THE INVENTION

An object of this invention is to provide polymers with improved processability, handling properties and solvent resistance while retaining the excellent properties, such as heat resistance and crystallinity, of the aforementioned melt-stable PTKs as much as possible. Another object of this invention is to provide a process for economically producing aromatic ketone copolymers having such properties.

With a view toward improving the processability of a PTK, the present inventors first of all attempted to lower the melting point, i.e., processing temperature of the PTK by random copolymerization of its monomer with monomers of a kind different from the first-mentioned monomer. Namely, 4,4'-dihalobenzophenone was used as a comonomer and copolymerized with dihalobenzene. However, the resultant random copolymers tended to have lower crystallinity and heat resistance and poorer melt stability as the proportions of the dihalobenzenes increased. Further, 4,4'-dihalo-benzophenones have been activated by the ketone group and have far higher reactivity compared with dihalobenzenes. They hence have extremely poor copolymerizability with dihalobenzenes.

The present inventors then attempted to produce a PTK-PATE copolymer in which a PATE having recurring units of the formula

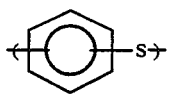

is incorporated as segments in the chain of a PTK. As a result, it has been found that a poly(arylene thioether-ketone) copolymer having excellent processability and high crystallinity can be obtained by using as an oligomer a PATE, which has a particular number-average polymerization degree and contains at least one terminal thiolate group and/or thiol group as a reactive terminal group, and reacting the PATE oligomer with a 4,4'-dihalo-benzophenone under specific conditions in an organic amide solvent.

It has also been found that a copolymer similar to the above-described copolymer can be obtained by reacting the PATE oligomer with a PTK oligomer under specific conditions. It has also been revealed that each of these copolymers can be obtained as granules having good handling properties from its polymerization system by a conventional collection method.

The present invention has been brought to completion on the basis of these findings.

In one aspect of this invention, there is thus provided a poly(arylene thioether-ketone) copolymer comprising (A) at least one poly(arylene thioether-ketone) segment having predominant recurring units of the formula

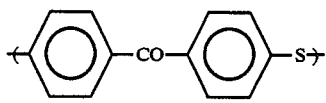

wherein the —CO— and —S— are in the para position to each other and (B) at least one poly(arylene thioether) segment having predominant recurring units of the formula

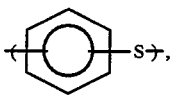

and having the following properties (a)–(c):

(a) the ratio of the total amount of the poly(arylene thioether) segment (B) to the total amount of the poly(arylene thioether-ketone) segment (A) ranging from 0.05 to 5 by weight, (b) the number-average polymerization degree of the poly(arylene thioether) segment (B) being higher than 1 but lower than 10, and (c) said copolymer having a melt viscosity of 2–100,000 poises as measured at 350° C. and a shear rate of 1,200/sec.

In another aspect of this invention, there is also provided a process for the production of a poly(arylene thioether-ketone) copolymer comprising (A) at least one poly(arylene thioether-ketone) segment and (B) at least one poly(arylene thioether) segment, which comprises at least the following two steps:

i) heating in the presence of water an organic amide solvent containing a dihalogenated aromatic compound, which consists principally of a dihalobenzene, and an alkali metal sulfide, whereby a poly(arylene thioether) oligomer having predominant recurring units of the formula

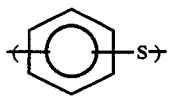

and at least one terminal thiolate group is synthesized, and ii) mixing the oligomer, which has been obtained in the step i), with a dihalogenated aromatic compound consisting principally of at least one dihalobenzophenone selected from 4,4′-dichlorobenzophenone and 4,4′-dibromobenzophenone, and optionally, an alkali metal sulfide, an organic amide solvent and/or water, and heating the resultant mixture to form a poly(arylene thioether-ketone) segment having predominant recurring units of the formula

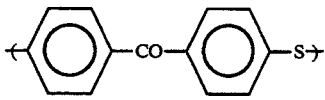

wherein the —CO— and —S— are in the para position to each other, thereby forming the copolymer;

said first and second steps i) and ii) being conducted under the following conditions (a)–(f):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.3–0.9 (mol/mol), and the polymerization being conducted in such a manner that the resulting poly(arylene thioether) oligomer has at least one terminal thiolate group and its number-average polymerization degree becomes higher than 1 but lower than 10, (b) in the second step ii), the ratio of the water content to the amount of the charged organic amide solvent being controlled within a range of 0.1–15 (mol/kg), (c) in the second step ii), the ratio of the total amount of the charged dihalogenated aromatic compound, said total amount being the amount of the whole dihalogenated aromatic compounds including the dihalobenzene and the dihalobenzophenone, to the total amount of the charged alkali metal sulfide, said latter total amount being the total amount of the alkali metal sulfide charged in the first step i) and that optionally charged in the second step ii), being controlled within a range of 0.95–1.2 (mol/mol), (d) the ratio of the charged amount of the dihalogenated aromatic compound consisting principally of the dihalobenzene in the step i) to the charged amount of the dihalogenated aromatic compound consisting principally of the dihalobenzophenone in the step ii) being controlled within a range of 0.1–10 (mol/mol), (e) the reaction of the second step ii) being conducted within a temperature range of 150°–300° C. with the proviso that the reaction time at 210° C. and higher is not longer than 10 hours, and (f) in the second step ii), the reaction being conducted until the melt viscosity of the resulting copolymer becomes 2–100,000 poises as measured at 350° C. and a shear rate of 1,200/sec.

In a further aspect of this invention, there is also provided a process for the production of a poly(arylene thioether-ketone) copolymer comprising (A) at least one poly(arylene thioether-ketone) segment and (B) at least one poly(arylene thioether) segment, which comprises at least the following three steps:

i) heating in the presence of water an organic amide solvent containing a dihalogenated aromatic compound, which consists principally of a dihalobenzene, and an alkali metal sulfide, whereby a poly(arylene thioether) oligomer having predominant recurring units of the formula

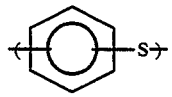

and at least one terminal thiolate group is synthesized, ii) heating in the presence of water an organic amide solvent containing a dihalogenated aromatic compound, which consists principally of at least one dihalobenzophenone selected from 4,4′-dichlorobenzophenone and 4,4′-dibromobenzophenone, and an alkali metal sulfide, whereby a poly(arylene thioether-ketone) oligomer having predominant recurring units of the formula

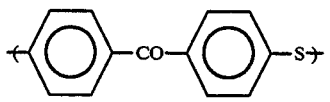

wherein the —CO— and —S— are in the para position to each other, and terminal halogen atoms is synthesized, and iii) mixing and reacting the poly(arylene thioether) oligomer, which has been obtained in the step i), with poly(arylene thioether-ketone) oligomer obtained in the step ii) and optionally, water;

said first through third steps i)-iii) being conducted under the following conditions (a)–(g):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.3–0.9 (mol/mol), and the polymerization being conducted until the number-average polymerization degree of the poly(arylene thioether) oligomer becomes higher than 1 but lower than 10, (b) in the second step ii), the ratio of the water content to the amount of the charged organic amide solvent being controlled within a range of 0.1–15 (mol/kg) and the reaction being conducted within a temperature range of 60°–300° C. with the proviso that the reaction time at 210° C. and higher is not longer than 10 hours, (c) in the third step iii), the ratio of the water content to the amount of the charged organic amide solvent being 0.1–15 (mol/kg), (d) in the third step iii), the ratio of the total amount of the charged dihalogenated aromatic compound, said total amount being the amount of the whole dihalogenated aromatic compounds including the dihalobenzene and the dihalobenzophenone, to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the charged amount of the dihalogenated aromatic compound consisting principally of the dihalobenzene in the step i) to the charged amount of the dihalogenated aromatic compound consisting principally of the dihalobenzophenone in the step ii) being controlled within a range of 0.1–10 (mol/mol), (f) the reaction of the third step iii) being conducted within a temperature range of 150°–300° C. with the proviso that the reaction time at 210° C. and higher is not longer than 10 hours, and (g) in the third step iii), the reaction being conducted until the melt viscosity of the resulting copolymer becomes 2–100,000 poises as measured at 350° C. and a shear rate of 1,200/sec.

DETAILED DESCRIPTION OF THE INVENTION

Features of the present invention will hereinafter be described in detail.

Poly(Arylene Thioether-Ketone) Copolymer

Chemical structure of copolymer

The poly(arylene thioether-ketone) copolymers according to the present invention are copolymers comprising (A) at least one PTK segment having predominant recurring units of the formula

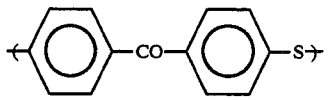

wherein the —CO— and —S— are in the para position to each other and (B) at least one PATE segment having predominant recurring units of the formula

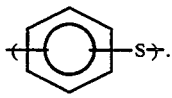

The PTK segment (A) and the PATE segment (B) contain respectively the above-described recurring units in proportions of at least 50 wt. %, preferably at least 70 wt. %, particularly preferably at least 80 wt. %. By the way, as the recurring unit of the segment (B), the recurring unit of the formula

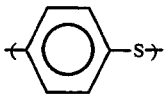

is preferred because it can afford copolymers excellent especially from the viewpoint of crystallinity, melt stability, heat resistance, mechanical properties, solvent resistance, moisture absorption resistance and the like.

The copolymer of the present invention can have a desired structure containing both segments in an alternate order, such as (A)—(B)—(A)$_m$(B)—(A), m being 0 or an integer of 1 or greater or (A)—(B)—(A)$_n$(B), n being 0 or an integer of 1 or greater.

It is however required that the weight ratio of the total amount of segments (B) to the total amount of segments (A) be within a range of 0.05–5, preferably 0.1–4, more preferably 0.15–3.

The segment (A) serves to impart high degree of heat resistance and crystallinity to the copolymer. On the other hand, the segment (B) contributes to the reduction of the processing temperature and the granulation while maintaining the high crystallinity. Therefore, copolymers in each of which the weight ratio of the total amount of segments (B) to the total amount of segments (A) is at least 0.05 but lower than 1, preferably at least 0.1 but lower than 1 feature particularly good heat resistance and high crystallinity. Ratios in a range of 1–5, preferably 1–4 give copolymers excellent especially in processability while retaining excellent crystallinity. However, any weight ratios of the total amount of segments (B) to the total amount of segments (A) lower than 0.05 are too low to achieve any sufficient reduction in processing temperature or the formation into granules. To the contrary, any ratios higher than 5 lead to a substantial reduction in heat resistance and disturb the balancing between heat resistance and processability. Ratios outside the above range are therefore not preferred.

It is essential for the segment (B) to have a number-average polymerization degree higher than 1 but lower than 10, preferably, in a range of 2–9, more preferably, in a range of 3–8. When the length of each segment in the copolymer according to the present invention is shortened, the melting point becomes sharp, and the uniformity in composition becomes high, so that preferred processability and physical properties can easily be achieved.

If the number-average polymerization degree of the segment (B) is not lower than 10, the resulting copolymer becomes similar to a block copolymer, so that it has physical properties characteristic of both PATE and PTK, for example, melting points corresponding to those thereof and requires a temperature higher than that of the copolymer according to the present invention upon its forming or molding. Therefore, its melt processing temperature becomes higher, so that melt processing facilities for high-temperature processing are required. Further, a stringent temperature control is required to perform melt processing without deterioration by heat. Furthermore, since each segment is long, the composition distribution of the copolymer becomes wider correspondingly. Polymerization degrees outside the above range are therefore not preferred.

Besides, a segment (B) having a number-average polymerization degree of 1, i.e.

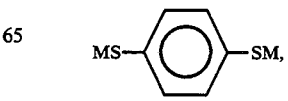

being an alkali metal, is difficult to produce.

Incidentally, the number-average polymerization degree of the PATE segment in this invention is determined by gel permeation chromatography (GPC) at a stage of the PATE oligomer. Measuring conditions are as follows:

Column: SHODEX AT80M/S, two columns in series
Solvent: α-chloronaphthalene
Flow rate: 0.7 ml/min
Temperature: 220° C.
Sample concentration: 0.05 wt. %
Charged amount: 200 μl
Detector: flame ionization detector (FID)
Calibration of molecular weight: standard poly(styrene) and

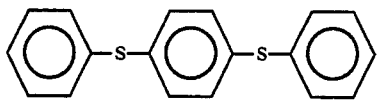

Data processing: SIC 7000B (manufactured by System Instrument Co.)

The segment (A) and segment (B) can contain one or more recurring units other than their predominant recurring units of the formulae

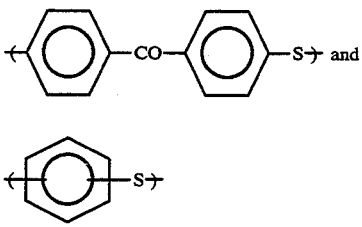

to an extent that the objects of the present invention are not impaired.

In general, these other recurring units can be introduced into the copolymers by using the corresponding various dihalogenated aromatic compounds as comonomers.

Physical properties of the copolymers

Physical properties and other characteristics of the poly(arylene thioether-ketone) copolymers according to this invention will next described in detail from the viewpoint of processability, melt stability, crystallinity and the like.

(1) Processability:

The melting point of PTK homopolymer as polymerized is about 360° C. The extent of a reduction in the melting point due to copolymerization with another monomer of a different kind, $\Delta Tm = [360°\ C. - Tm$ (melting point of copolymer)] is generally proportional to the extent of a reduction in the melt processing temperature. Accordingly, $\Delta Tm$ can be used as an index indicative of processing temperature reducing effect, namely, processability improving effect.

$\Delta Tm$ may preferably be 10–80° C., more preferably 20°–70° C., most preferably 30–65° C. If $\Delta Tm$ is lower than 10° C., there is a potential problem that the processability improving effect may not be sufficient. If $\Delta Tm$ is higher than 80° C. on the other hand, there is another potential problem that the copolymer may lose the characteristics as a heat-resistant resin. $\Delta Tm$ outside the above range is therefore not preferred.

(2) Crystallinity

One of great features of the copolymers according to this invention resides in that they have not only excellent processability but also high crystallinity. Crystallinity imparts high heat resistance to a copolymer. To have a copolymer equipped with high heat resistance, it is essential that the copolymer has sufficient crystallinity.

In general, melt crystallization enthalpy, $\Delta Hmc$ is proportional to the degree of crystallization when a molten polymer undergoes crystallization. On the other hand, melt crystallization temperature, Tmc serves as an index of the readiness of crystallization. Therefore, the melt crystallization enthalpy, $\Delta Hmc$ (400° C.) and melt crystallization temperature, Tmc (400° C.) of a copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the copolymer.

In addition, residual melt crystallization enthalpy, $\Delta Hmc$ (400° C./10 min) and melt crystallization temperature, Tmc (400° C./10 min) measurable upon determination of the residual crystallinity, both of which will be described subsequently, can be used as an index of not only melt stability but also crystallinity.

The copolymers according to this invention may preferably have $\Delta Hmc$ (400° C.) of at least 15 J/g, more preferably at least 20 J/g, most preferably at least 25 J/g. On the other hand, Tmc (400° C.) may desirably be at least 180° C., with at least 190° C. being more preferred. Copolymers having $\Delta Hmc$ (400° C.) smaller than 15 J/g or Tmc (400° C.) lower than 180° C. may have insufficient heat resistance as heat-resistant polymers and are hence not preferred.

(3) Melt stability

The greatest feature of the copolymers according to this invention resides in that they have melt stability sufficient to permit the application of conventional melt processing techniques. Polymers of poor melt stability tend to lose their crystallinity or to undergo crosslinking or carbonization, resulting in a rapid increase in melt viscosity, upon melt processing. It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use as indices of the melt stability of a copolymer its residual melt crystallization enthalpy, $\Delta Hmc$ (400° C./10 min) and melt crystallization temperature, Tmc (400° C./10 min), which are determined at a cooling rate of 10° C./min after the copolymer is held at 50° C. for 5 minutes in an inert gas atmosphere, heated to 400° C. at a rate of 75° C./min and then held for 10 minutes at 400° C. which is higher than the melt processing temperature of the copolymer. In the case of a copolymer having poor melt stability, it undergoes crosslinking or the like under the above conditions, namely, when it is held for 10 minutes at the high temperature of 400° C., whereby the copolymer loses its crystallinity substantially.

The copolymers of this invention are polymers having the physical properties that their residual melt crystallization enthalpies, $\Delta Hmc$ (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C. A polymer, whose ΔHmc (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, ΔHmc (400° C.)/ΔHmc (400° C./10 min) can also be used as an index of melt stability. Deterioration by heat becomes smaller as this ratio decreases. Therefore, it is preferably that ΔHmc (400° C./10 min) is at least 10 J/g and the above ratio is 5 or smaller, more preferably 3 or smaller.

(4) Melt viscosity

In this invention, the melt viscosity, $\eta^*$ of each copolymer is used as an index of its molecular weight. Specifically, a polymer sample is filled in a Capirograph manufactured by Toyo Seiki Seisaku-Sho, Ltd. and equipped with a nozzle having an inner diameter of 1 mm and an L/D ratio of 10/1 and is preheated at 350° C. for 5 minutes. Its melt viscosity, $\eta^*$ is measured at a shear rate of 1,200/sec.

The copolymers of the present invention have a melt viscosity, $\eta^*$ of 2–100,000 poises, preferably 5–50,000 poises, more preferably 10–30,000 poises. Those having a melt viscosity, $\eta^*$ lower than 2 poises have an unduly low molecular weight, so that their flowability is too high to conduct conventional melt processing. Even if melt-formed or melt-molded products are obtained, their physical properties are considerably inferior. Such low melt viscosities are therefore not preferred. On the other hand, those having a melt viscosity, $\eta^*$ higher than 100,000 poises have an unduly high molecular weight, so that their flowability is too low to conduct conventional melt processing. Such high melt viscosities are therefore not preferred either.

Production Process of Copolymers

A variety of processes may be contemplated for the production of the copolymers, for example, including:

(1) A dihalogenated aromatic compound consisting principally of a 4,4'-dihalobenzophenone is added to and reacted with a PATE oligomer which has been prepared in advance, whereby a PTK segment (A) is formed to form a copolymer.

(2) A dihalogenated aromatic compound consisting principally of a dihalobenzene is added to and reacted with a PTK oligomer which has been prepared in advance, whereby a PATE segment (B) is formed to form a copolymer.

(3) A PTK oligomer and a PATE oligomer, which have been prepared separately, are chemically combined together.

The present inventors carefully studied those processes. As a result, it has been found that the processes (1) and (3) are preferable for obtaining the copolymers of this invention.

A. Raw materials for copolymers

In the process for the production of a copolymer of this invention, an alkali metal sulfide and a dihalogenated aromatic compound are employed as principal raw materials for the polymer, and as reaction polymerization media are employed an organic amide solvent and water including water of hydration.

(1) Alkali metal sulfide

Illustrative examples of the alkali metal sulfide useful in the practice of this invention include lithium sulfide, sodium sulfide, potassium sulfide, rubidium sulfide, cesium sulfide and mixtures thereof. Among these alkali metal sulfides, sodium sulfide is industrially preferred for its low price. An alkali metal sulfide which may be formed in situ in the reaction system can also be used.

(2) Dihalogenated aromatic compound

The dihalogenated aromatic compound employed in the present invention for the formation of the PTK segment (A), including a PTK oligomer, consists principally of one or more dihalobenzophenones, i.e., 4,4'-dichlorobenzophenone and/or 4,4'-dibromobenzophenone.

The dihalogenated aromatic compound used in the present invention for the formation of the PATE segment (B), including a PATE oligomer, consists principally of a dihalobenzene such as p-dichlorobenzene or m-dichlorobenzene.

As other copolymerizable dihalogenated aromatic compounds, may be mentioned, for example, dihalobenzophones other than 4,4'-isomers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof. As substituent halogen atoms, chlorine or bromine atoms may be used preferably from the economical viewpoint. Within a range not giving too much effect to cost, a small amount of a fluorine compound, for example, difluorobenzophenone or the like may also be used in combination.

It is also permissible to produce a copolymer, which has a partially crosslinked and/or branched structure, by causing a trihalogenated or higher polyhalogenated compound to exist in a reaction system in such a small amount that the processability and physical properties of the copolymer may not be impaired to any substantial extent.

(3) Organic amide solvent

As reaction media useful for the production process of the copolymers according to this invention, aprotic polar organic solvents having excellent heat stability and alkali resistance can be used. Of these, organic amide solvents, including carbamic amides, and sulfone solvents are particularly preferred.

As such organic amide solvents and sulfone solvents, may be mentioned N-methylpyrrolidone, N-ethylpyrrolidone, N,N'-ethylenedipyrrolidone, pyrrolidones, hexamethylphosphoric triamide, tetramethylurea, dimethylimidazolidinone, dimethylacetamide, ε-caprolactam, N-ethylcaprolactam, sulfolane, diphenyl sulfone, etc. They may also be used as a mixed solvent. Among these organic amide solvents, N-methylpyrrolidone or its mixed solvent is particularly preferred from the viewpoint of the readiness in obtaining a melt-stable copolymer, thermal and chemical stability, economy, etc.

B. Polymerization process and reaction conditions

For the preparation of the PATE oligomer, for the reaction in which the PTK segment is formed in the presence of the PATE oligomer to form a copolymer, for the preparation of the PTK oligomer and for the reaction in which the PTK oligomer and PATE oligomer are combined together to form a copolymer, it is necessary to conduct the reaction under special conditions, namely by causing Water to exist in specific amounts in the reaction systems, controlling the monomer compositions suitably, regulating the polymerization temperatures appropriately, and limiting reaction time at high temperatures to specific short periods of time. It is effective for the production of copolymers having more preferable physical properties, for example, to choose a suitable material for the reactor and to apply stabilization treatment in a final stage of the reaction. Unless these reaction conditions are suitably controlled, it is difficult to provide crystalline copolymers having melt stability suitable for conventional melt processing.

Preparation process of oligomers (1) PATE oligomer

The PATE oligomer employed as a raw material for the copolymer of this invention can be prepared by having an alkali metal sulfide and a dihalogenated aromatic compound, which consists principally of a dihalobenzene, undergo a reaction in the presence of water in an organic amide solvent under the following conditions (a)-(c):

(a) The ratio of the water content to the amount of the charged organic amide solvent is within a range of 0.1-15 (mol/kg), preferably 0.3-12 (mol/kg), more preferably 0.5-11 (mol/kg).

(b) The ratio of the amount of the charged dihalogenated aromatic compound to the amount of the charged alkali metal sulfide is within a range of 0.3-0.9 (mol/mol), preferably 0.4-0.8 (mol/mol), more preferably 0.5-0.75 (mol/mol).

(c) The reaction is conducted at a temperature within a range of 150°-290° C., preferably 200°-280° C., and controlled in such a manner that the number-average polymerization degree of the resulting oligomer is higher than 1 but lower than 10, preferably within a range of 2-9, more preferably within a range of 3-8.

In this reaction, the amount of the charged alkali metal sulfide is more than that of the charged dihalogenated aromatic compound. Therefore, the PATE oligomer formed has at least one terminal thiolate group. The oligomer having at least one terminal thiolate group means an oligomer having a thiolate group on its each terminal or one terminal, or a mixture thereof. The PATE oligomer may contain some crosslinked structure and/or branched structure introduced typically by allowing a trihalobenzene or higher polyhalobenzene to present in a small amount in the polymerization reaction system. Incidentally, among the recurring units of the formula

the recurring unit of the formula

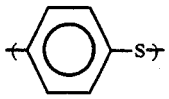

is preferred.

(2) PTK oligomer

The PTK oligomer employed as a raw material for the copolymer of this invention can be prepared in the following manner.

Namely, the PTK oligomer can be prepared by having an alkali metal sulfide and a dihalogenated aromatic compound, which consists principally of 4,4'-dichlorobenzophenone and/or 4,4'-dibromobenzophenone, undergo a reaction in the presence of water in an organic amide solvent under the following conditions (a)-(b):

(a) The ratio of the water content to the amount of the charged organic amide solvent is within a range of 0.1-15 (mol/kg), preferably 1-12 (mol/kg), more preferably 2.5-10 (mol/kg). Water contents lower than 0.1 mole can hardly provide a PTK oligomer having high melt stability and moreover tend to induce decomposition in the polymerization reaction. On the other hand, water contents higher than 15 moles result in a reduction in the reaction rates. Neither such high nor low water contents are hence preferred economically.

(b) The reaction is conducted at a temperature within a range of 60°-300° C. with the proviso that the reaction time at 210° C. and higher is not longer than 10 hours. The temperature may preferably be within a range of 150°-290° C., more preferably 170°-260° C.

The PTK oligomer has at least one terminal halogen atom. The PTK oligomer may contain some crosslinked structure and/or branched structure introduced typically by allowing a trihalobenzophenone or higher polyhalobenzophenone to present in a small amount in the polymerization reaction system.

The reduced viscosity of the PTK oligomer is 0.2 dl/g or lower, preferably 0.1 dl/g or lower, more preferably 0.05 dl/g or lower as determined by viscosity measurement at 30° C. and a polymer concentration of 1.0 g/dl in 98% concentrated sulfuric acid. 10 The ratio of the amount of the charged dihalogenated aromatic compound to the amount of the charged alkali metal sulfide upon synthesis of the PTK oligomer may preferably be at least 1.15 (mol/mol), more preferably at least 1.2 (mol/mol), most preferably at least 1.3 (mol/mol). Besides, with respect to the ratio of the amount of the charged organic amide solvent to the amount of the charged alkali metal sulfide in the composition of charges upon synthesis of the PTK oligomer, it is desirable to charge the organic amide solvent, in general, in an amount of 0.6-100 kg, more preferably 0.7-50 kg per mole of the amount of the charged alkali metal sulfide, depending upon the composition of the charged dihalogenated aromatic compound.

Production process of copolymers

As a first production process for each copolymer according to this invention, may be described the process (Production Process No. 1) in which a PATE oligomer is prepared in advance and at least one PTK segment is formed in the presence of the PATE oligomer. This process is substantially a two-step process.

In the second step, the reaction mixture containing the oligomer obtained in the first step may be mixed with a dihalogenated aromatic compound consisting principally of at least one dihalobenzophenone selected from 4,4'-dichlorobenzophenone and 4,4'-dibromobenzophenone, and the resultant mixture may be heated without further addition of any alkali metal sulfide, organic amide solvent or water, thereby obtaining a copolymer. It goes without saying that the alkali metal sulfide, organic amide solvent or water may be added further in the second step.

As a second production process for each copolymer according to this invention, may be described the process (Production Process No. 2) in which PATE and PTK oligomers are prepared in advance and are then reacted to combine them together. This process is substantially a three-step process.

The reaction conditions employed in the synthesis stage of the copolymer will hereinafter be described in further detail.

(1) Water content

In the process for the preparation of the copolymer of this invention, the water content in the reaction system may desirably be within a range of 0.1-15 moles, preferably 2.5-15 moles, more preferably 3.5-14 moles per kg of the amount of the charged organic amide solvent. Water contents lower than 0.1 mole can hardly provide a copolymer having high melt stability and moreover tend to induce decomposition in the polymerization reaction. On the other hand, water contents higher than 15 moles result in a reduction in the reaction rates, so that the reaction requires an unduly long period of time. Such high water contents are hence not preferred in industry. In order to adjust the water content in a reaction system, the water content may be reduced by distillation or the like or may be increased by adding water prior to the initiation of a polymerization reaction.

(2) Composition of monomers charged

The ratio of the total amount of the dihalogenated aromatic compound to the total amount of the alkali metal sulfide, both charged upon synthesis of the copolymer, may desirably be in a range of 0.95-1.2 (mol/mol), more preferably 0.97-1.10 (mol/mol), most preferably 0.98-1.05 (mol/mol). Here, the term "the total amount of the charged alkali metal sulfide" means the sum of the amount of the alkali metal sulfide charged upon synthesis of the PTK oligomer and/or the PATE oligomer and the amount of the alkali metal sulfide charged upon synthesis of the copolymer. When a copolymer is synthesized using a portion or portions of synthesized PTK oligomer and/or PATE oligomer, the amounts of the alkali metal sulfide and dihalogenated aromatic compound charged upon synthesis of each oligomer must be taken into consideration.

Ratios smaller than 0.95 can hardly provide a copolymer having excellent melt stability and tend to induce decomposition during the reaction. On the other hand, ratios greater than 1.2 can only provide a copolymer having a low molecular weight. Besides, with respect to the ratio of the amount of the charged organic amide solvent to the amount of the charged alkali metal sulfide in the compositions of charges upon synthesis of the PATE oligomer and copolymer, it is desirable to charge the organic amide solvent, in general, in an amount of 0.3-5 kg, more preferably 0.4-3 kg per mole of the amount of the charged alkali metal sulfide, depending upon the composition of the charged dihalogenated aromatic compound.

Where the alkali metal sulfide is lost by a distilling operation or the like prior to the initiation of the reaction, the term "the amount of the charged alkali metal sulfide" as used herein means the remaining amount which is obtained by subtracting the loss from the amount actually charged.

The segment (A) serves to impart high degree of heat resistance and crystallinity to the copolymer. On the other hand, the segment (B) contributes to the reduction of the processing temperature and the granulation while maintaining the high crystallinity. Accordingly, the ratio of the charged amount of the dihalogenated aromatic compound consisting principally of the dihalobenzene in the first step to the charged amount of the dihalogenated aromatic compound consisting principally of the dihalobenzophenone in the second step is controlled within a range of 0.1-10 (mol/mol), preferably 0.2-7.5 (mol/mol), more preferably 0.3-6.0 (mol/mol). Further, copolymers in each of which this ratio is within a range of 0.1-1.9, preferably 0.2-1.9 feature particularly good heat resistance and high crystallinity. Ratios in a range of 2-10, preferably 2-7.5 give copolymers excellent especially in processability while retaining excellent crystallinity. However, any ratios lower than 0.1 are too low to achieve any sufficient reduction in processing temperature or the formation into granules. To the contrary, any ratios higher than 10 lead to a substantial reduction in heat resistance and disturb the balancing between heat resistance and processability. Ratios outside the above range are therefore not preferred.

The term "the amount of the charged dihalogenated aromatic compound" as used herein should be interpreted not to include the amount of the halogen-substituted aromatic compound added in the final stage of the reaction for effecting a stabilizing treatment to be described subsequently. (3) Reaction temperature and reaction time In the process of this invention for the production of the copolymer, the reaction is conducted at a temperature in a range of 150-300° C., preferably 200-290° C., more preferably 210-280° C. Reaction temperatures lower than 150° C. require an unduly long time to obtain the copolymer and are therefore economically disadvantageous. On the other hand, reaction temperatures higher than 300° C. can hardly obtain the copolymer in a form excellent in melt stability and moreover involve a potential problem of decomposition during the reaction.

The polymerization time required for obtaining a PTK oligomer or copolymer of a desired molecular weight becomes shorter as the polymerization temperature increases but becomes longer as the polymerization temperature decreases. Accordingly, it is generally advantageous to conduct the polymerization at a temperature of 210° C. or higher from the viewpoint of productivity. It is however not preferred to conduct the reaction at a temperature of 210° C. or higher for 10 hours or longer, because a PTK oligomer or copolymer having excellent melt stability can hardly be obtained under such conditions.

(4) Reactor

In the process of this invention for the production of each of the PTK oligomer, PATE oligomer and copolymer, it is preferable to use, as a reactor (including equipment employed for provisional procedures of the polymerization reaction, for example, those required for dehydration and the like), a reactor which is made of a corrosion-resistant material at least at portions with which the reaction mixture is brought into direct contact. The corrosion-resistant material is supposed to be inert so that it does not react with the reaction mixture. Preferable examples of the corrosion-resistant material include titanium materials such as titanium and titanium-containing alloys and nickel-containing corrosion-resistant materials. Of these, it is particularly preferred to use a reactor lined with a titanium material.

The use of a reactor made of a corrosion-resistant material such as that described above makes it possible to obtain a copolymer having high heat resistance and molecular weight.

(5) Treatment in the final stage of the reaction

Although a copolymer having excellent melt stability can be obtained by the above-described production process, the copolymer can be obtained in a form improved further in melt stability by adding a certain kind of halogen-containing compound to the reaction system and causing it to undergo a reaction in a final stage of the reaction.

As halogen-containing compounds, may be mentioned $C_1$–$C_3$ alkyl halides and halogen-substituted aromatic compounds. It is particularly preferable to use at least one halogen-substituted aromatic compound which contains at least one group having electron-withdrawing property at least equal to —CO— group. As illustrative examples of such a halogen-substituted aromatic compound, may be mentioned bis(chlorobenzoyl)benzenes, dihalobenzophenones, dihalodiphenylsulfones, monohalobenzophenones and the like, and mixtures thereof.

It is desirable to conduct the final-stage treatment by adding the above-mentioned halogen-substituted aromatic compound in an amount of 0.1–20 moles, preferably 0.5–10 moles per 100 moles of the charged alkali metal sulfide to the polymerization reaction system in the final stage of the reaction and then allowing it to react at 60°–300° C., more preferably 150°–290° C., most preferably 220°–280° C. for 0.1–20 hours, more preferably 0.1–8 hours.

(6) Conditions for the granulation

Another principal feature of the process of this invention for the production of the copolymer resides in that the copolymer excellent in melt stability can be obtained as granules by suitably choosing the aforementioned reaction conditions for the copolymer further. Reaction conditions for obtaining at least 50 wt. % of the resulting copolymer as granules collectible by means of a sieve having an opening size of 75 μm (200 mesh) will next be described in further detail.

(i) Weight ratio of the total amount of segment or segments (B) to the total amount of segment or segments (A) in the copolymer The weight proportion of segment or segments (B) in the copolymer is an important parameter since each segment (B) contributes to the granulation. When it is desired to obtain the copolymer of this invention as granules, it is necessary to control the ratio of the total amount of segment or segments (B) to the total amount of segment or segments (A) at 0.2–5, preferably 0.3–4, more preferably 0.4–3, all by weight.

If this ratio is lower than 0.2, it becomes difficult to obtain the copolymer as granules. On the contrary, ratios higher than 5 lead to a substantial reduction in the heat resistance of the copolymer. Neither such low nor high ratios are preferred.

(ii) Reaction temperature and time for the granulation

To obtain the copolymer as granules, it is desirable to raise the reaction temperature to a high temperature of at least 240°–290° C., more preferably 250°–290° C. in the course of the reaction or in a final stage of the reaction. Reaction temperatures lower than 240° C. make it difficult to obtain the copolymer as granules. On the contrary, it is difficult to obtain the copolymer in a form excellent in melt stability if the reaction temperature is higher than 290° C.

The time required for obtaining the copolymer as desired granules becomes shorter as the reaction temperature increases. Conversely, it becomes longer as the reaction temperature decreases. Therefore, it is generally advantageous from the viewpoint of productivity to conduct the reaction at a high temperature of 250° C. or higher. It however becomes difficult to obtain the copolymer in a form excellent in melt stability if the reaction at high temperatures of 250° C. and higher is continued for 7 hours or longer.

C. Collection of copolymers

To collect the copolymer from the reaction mixture, the following method can be followed. Namely, after completion of the reaction including the treatment in the final stage if applied, the reaction mixture is subjected to flushing and/or distillation, whereby the solvent is removed either partly or wholly to concentrate the reaction mixture. If necessary, the concentrate may be heated to remove any remaining solvent. The resulting solids or concentrate is washed with water and/or an organic solvent to eliminate soluble components such as salts formed in the reaction. The residue is again dried under heat to collect the polymer.

By suitably choosing the reaction conditions in the process of this invention for the production of the copolymer, at least 50 wt. % of the resulting copolymer can be obtained as granules which can be captured on a screen having an opening size of 75 μm (200 mesh), more preferably 106 μm (140 mesh), most preferably 150 μm (100 mesh).

As has been described above, the copolymer can be easily collected as granules by a screen or the like from the reaction mixture after completion of the reaction. The granular polymer thus collected is washed with water and/or an organic solvent and then dried under heat to obtain it in a dry form. Since the copolymer is in a granular form and has excellent handling property, it permits easy separation, water washing, transportation, metering and the like.

Application Fields

The copolymers according to the present invention are crystalline and permit the application of conventional melt processing techniques. They can be formed or molded into various heat-resistant products and can then be used in various fields. For example, extrusion products may include sheets, plates, pipes, tubes, covered conductors, etc. Injection-molded products may be used as electronic and electric parts, car parts, etc. On the other hand, unstretched films may be employed as base films for magnetic recording, capacitor films, printed circuit boards, insulating films, prepreg sheets, and so on.

ADVANTAGES OF THE INVENTION

The present invention can provide crystalline poly(arylene thioether-ketone) copolymers uniform in composition and excellent in heat resistance, melt stability, processability and handling properties.

The invention can also economically provide such poly(arylene thioether-ketone) copolymers. The invention can also provide various formed or molded products of such poly(arylene thioether-ketone) copolymers.

EMBODIMENTS OF THE INVENTION

The present invention will hereinafter be described in further detail by the following examples and comparative examples. It should however be borne in mind that the present invention is not limited only to the following examples.

Example 1 (Production Process No. 1)

(Synthesis of PATE oligomer)

A titanium-lined reactor was charged with 3200 g of hydrated sodium sulfide (water content: 53.8 wt. %) and 6000 g of N-methylpyrrolidone (hereinafter abbreviated as "NMP"). While gradually heating the contents to 203° C. in a nitrogen gas atmosphere, 2376 g of an NMP solution, which contained 1309 g of water, and 12.98 g of hydrogen sulfide were distilled out. Thereafter, 103 g of water was added. A liquid mixture consisting of 1910 g of p-dichlorobenzene (hereinafter abbreviated as "PDCB") and 4350 g of NMP was then fed, followed by polymerization at 220° C. for 4 hours and further at 230° C. for 4 hours (PDCB/sodium sulfide =0.70 mol/mol; water content/NMP =3.1 mol/kg), whereby about 13.174 kg of a reaction slurry (Slurry $S_1$) containing a poly(p-phenylene thioether) (hereinafter abbreviated as "PPTE") oligomer (Oligomer $P_1$) was obtained.

A portion of Reaction Slurry $S_1$ was sampled out, and the amount of the remaining monomer and the number-average polymerization degree were determined. The amount of PDCB (remaining monomer) in the reaction slurry as determined by gas chromatography was lower than 0.1 wt. % of the charged amount. The number-average polymerization degree of Oligomer $P_1$ was 5.

The number-average polymerization degree was determined by preparing a sample in the following manner and subjecting it to high-temperature GPC. Immediately after completion of the polymerization of the oligomer, a portion of the reaction slurry was sampled out and then poured into water, and the water was adjusted to a pH of 3.0 with hydrochloric acid to have the oligomer precipitated. The oligomer was collected by filtration, thoroughly washed in distilled water and then dried at room temperature under reduced pressure in a vacuum drier, thereby obtaining an oligomer sample. The thus-obtained oligomer sample was added to e-chloronaphthalene to a concentration of 0.05 wt. % and dissolved therein under heat, thereby preparing a sample solution for GPC. The measuring conditions for high-temperature GPC are as described above.

(Synthesis of copolymer)

A titanium-lined reactor was charged with 8.0 g of hydrated sodium sulfide (water content: 53.8 wt. %), 63.4 g of 4,4'-dichlorobenzophenone (hereinafter abbreviated as "DCBP"), 501 g of Reaction Slurry $S_1$ thus obtained, 278 g of NMP and 89.7 g of water. After the reactor being purged with nitrogen, the contents were heated to 265° C. at which they were polymerized for 0.5 hour. To conduct the stabilizing treatment in the final stage of polymerization, the reaction mixture was cooled to 240° C., in which a mixture of 7.5 g of DCBP and 70 g of NMP was put under pressure to react them at 240° C. for 0.5 hour.

The reaction conditions upon synthesis of the copolymer were as follows:

(1) The molar ratio of the total amount of the charged dihalogenated aromatic compound (the sum of the amount of PDCB charged upon synthesis of Oligomer P1 and the amount of DCBP charged upon synthesis of the copolymer) to the total amount of the charged alkali metal sulfide (the sum of the amount of effective sodium sulfide charged upon synthesis of Oligomer $P_1$ and the amount of sodium sulfide charged upon synthesis of the copolymer) was 0.99.

(2) The molar ratio of the amount of PDCB charged in the first step to the amount of DCBP charged in the second step was 2.

(3) The ratio of the water content to the organic amide (NMP) was about 10 mol/kg.

(Collection of copolymer)

The resulting reaction mixture in the form of a slurry was diluted with a substantially equiamount of NMP and the granular polymer thus obtained was collected by a screen having an opening size of 150 μm (100 mesh). The polymer was washed three times with NMP and further three times with water, and then dried at 100° C. for 24 hours under reduced pressure to obtain a copolymer (Copolymer $C_1$). The collection rate of Copolymer $C_1$ was 88%.

(Inherent properties of Copolymer $C_1$)

Copolymer $C_1$ was in the form of granules having an average particle size of about 600 μm. By an infrared (IR) spectrum analysis, a strong absorption peak attributed to ketone group was observed at 1640 cm$^{-1}$. Wide angle X-ray diffraction which was conducted using "RAD-B System" manufactured by Rigaku Denki Kabushiki Kaisha showed a diffraction pattern apparently different from that corresponding to PATE homopolymer, PTK homopolymer or a blend thereof, or a block copolymer of PATE and PTK. The content of sulfur in Copolymer $C_1$ was determined by means of a sulfur analyzer ("EMIA-510" manufactured by Horiba Ltd.).

The weight fraction $W_b$(wt. %) of the recurring units

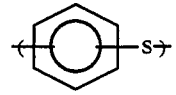

in the copolymer can be calculated in accordance with the following equation and was 51%.

$$W_b = (W - W_1)/(W_2 - W_1) \times 100$$

wherein W means the weight fraction of sulfur in the copolymer, $W_1$ denotes the weight fraction of sulfur in PTK recurring unit, and $W_2$ represents the weight fraction of sulfur in PATE recurring unit.

(Physical properties of copolymer)

The melt viscosity of Copolymer $C_1$ was 350 poises. Tmc and ΔHmc are shown in Table 1. Incidentally, the copolymer as polymerized had a melting point (Tm) of 312° C.

Example 2 (Production Process No. 1)

(Synthesis of PATE oligomer)

A titanium-lined reactor was charged with 1000.6 g of hydrated sodium sulfide (water content: 53.7 wt. %), 6000 g of NMP and 443.2 g of PDCB. The contents were polymerized at 220° C. for 10 hours (PDCB/sodium sulfide=0.508 mol/mol; water content/NMP=4.98 mol/kg), thereby obtaining a reaction slurry (Slurry $S_2$).

The amount of PDCB (remaining monomer) in the reaction slurry as determined in the same manner as in Example 1 was 0.1 wt. % of the charged amount. The number-average polymerization degree of the resultant oligomer (Oligomer $P_2$) was 5.

(Synthesis of copolymer)

A titanium-lined 1-l reactor was charged with 682.9 g of the thus-obtained Reaction Slurry $S_2$ and 69.3 g of DCBP. After the reactor being purged with nitrogen, the contents were heated to 240° C. at which they were polymerized for 3 hours.

The reaction conditions upon synthesis of the copolymer were as follows:

(1) The molar ratio of the total amount of the charged dihalogenated aromatic compound (the sum of the amount of PDCB charged upon synthesis of Oligomer $P_2$ and the amount of DCBP charged upon synthesis of the copolymer) to the total amount of the charged alkali metal sulfide (the amount of effective sodium sulfide charged upon synthesis of Oligomer $P_2$) was 1.01.

(2) The molar ratio of the amount of PDCB charged in the first step to the amount of DCBP charged in the second step was 1.

(3) The ratio of the water content to the organic amide (NMP) was about 5 mol/kg.

(Collection of copolymer)

The resulting reaction mixture in the form of a slurry was filtered by a filter paper (class: 5A) to collect solids. The thus-collected solids were washed with acetone and water repeatedly and then dried at 100° C., thereby obtaining a copolymer (Copolymer $C_2$). The collection rate of Copolymer $C_2$ was 96%.

(Physical properties of copolymer)

The physical properties of Copolymer $C_2$ are shown in Table 1. The melt viscosity of Copolymer $C_2$ was 60 poises. Copolymer $C_2$ was soluble in concentrated sulfuric acid, and its reduced viscosity was 0.28 dl/g as measured at 30° C. and a polymer concentration of 0.4 g/dl.

Example 3 (Production Process No. 2)

(Synthesis of PATE oligomer)

A titanium-lined reactor was charged with 3.20 kg of hydrated sodium sulfide (water content: 53.8 wt. %) and 6.00 kg of NMP. While gradually heating the contents to 203° C. in a nitrogen gas atmosphere, 2.326 kg of an NMP solution, which contained 1.282 kg of water, and 10.27 g of hydrogen sulfide were distilled out. Thereafter, 0.076 kg of water was added. A liquid mixture consisting of 2.193 kg of p-dichlorobenzene and 4.370 kg of NMP was then fed, followed by polymerization at 220° C. for 4 hours and further at 230° C. for 4 hours (PDCB/sodium sulfide=0.80 mol/mol; water content/NMP=3.1 mol/kg), whereby about 13.503 kg of a reaction slurry (Slurry $S_3$) containing an oligomer (Oligomer $P_3$) of PPTE was obtained. A portion of the reaction slurry was sampled out, and the amount of the remaining monomer and the number-average polymerization degree were determined in the same manner as in Example 1. As a result, the amount of the remaining monomer was lower than 0.1 wt. % of the charged amount, and the number-average polymerization degree of Oligomer $P_3$ was 8.

(Synthesis of PTK oligomer)

A titanium-lined reactor was charged with 2.271 moles of DCBP, 206.8 g of hydrated sodium sulfide (water content: 53.8 wt. %), 114 g of water and 2498 g of NMP. After the reactor being purged with nitrogen, the contents were maintained at 220° C. for 1 hour (water content/NMP=about 5 mol/kg) to obtain a reaction slurry (Slurry $KS_1$) containing a PTK oligomer (Oligomer $K_1$). After completion of the polymerization of the oligomer, a portion of the reaction slurry was sampled out and then poured into water, and the water was adjusted to a pH of 3.0 with hydrochloric acid to have the oligomer precipitated. The oligomer was collected by filtration, thoroughly washed in distilled water and then dried at room temperature under reduced pressure in a vacuum drier, thereby obtaining an oligomer sample. The thus-obtained oligomer sample was dissolved in 98% concentrated sulfuric acid to give a concentration of 1.0 g/dl so as to measure the reduced viscosity of the oligomer at 30° C. The reduced viscosity was extremely low and the value was lower than 0.05 dl/g.

(Synthesis of copolymer)

A titanium-lined reactor was charged with 448 g of Reaction Slurry $S_3$ containing PATE Oligomer $P_3$, 377 g of Reaction Slurry $KS_1$ containing PTK Oligomer $K_1$ and 64 g of water. After the reactor being purged with nitrogen, the contents were maintained at 265° C. for 0.5 hour to react them. To conduct the stabilizing treatment in the final stage of polymerization, the reaction mixture was cooled to 240° C., in which a mixture of 7.5 g of DCBP and 70 g of NMP was put under pressure to react them at 240° C. for 0.5 hour.

The reaction conditions upon synthesis of the copolymer were as follows:

(1) The molar ratio of the total amount of the charged dihalogenated aromatic compound (the sum of the amount of PDCB charged upon synthesis of PATE Oligomer $P_3$ and the amount of DCBP charged upon synthesis of PTK Oligomer $K_1$) to the total amount of the charged alkali metal sulfide (the sum of the amount of sodium sulfide charged upon synthesis of PATE Oligomer $P_3$ and the amount of sodium sulfide charged upon synthesis of PTK Oligomer $K_1$) was 0.98.

(2) The molar ratio of the amount of PDCB charged in the first step to the amount of DCBP charged in the second step was 2.

(3) The ratio of the water content to the organic amide (NMP) was about 10 mol/kg.

(Collection of copolymer)

The resulting reaction mixture in the form of a slurry was diluted with a substantially equiamount of NMP and the granular polymer thus obtained was collected by a screen having an opening size of 150 μm (100 mesh). The polymer was washed three times with NMP and further three times with water, and then dried at 100° C. for 24 hours to obtain a copolymer (Copolymer $C_3$) in the form&of granules having an average particle size of 1200 μm. The collection rate was 80%.

(Physical properties of copolymer)

The melt viscosity of Copolymer $C_3$ was 610 poises. Physical properties such as Tmc and ΔHmc are shown collectively in Table 1. Incidentally, Tm of the copolymer as polymerized was 316° C.

Comparative Example 1

(Synthesis of PTK homopolymer)

A titanium-lined reactor was charged with 9.0 moles of DCBP, 9.0 moles of hydrated sodium sulfide (water content: 53.6 wt. %) and 9.0 kg of NMP. After the reactor being purged with nitrogen, the resultant mixture was maintained at 240° C. for 2 hours and at 260° C. for 30 minutes to react them (water content/NMP=5.0 mol/kg). The reactor was cooled, and the reaction mixture in the form of a slurry was taken out of the reactor. A portion of the slurry was passed through a screen having an opening size of 75 μm (200 mesh). However, no granular polymer was collected at all. The remaining slurry was poured into about 20 liters of acetone to have the resultant polymer precipitated. The polymer was collected by filtration, and then washed twice with acetone and additionally twice with water. Acetone and water were removed to obtain the polymer in a wet form. The wet polymer was dried at 80° C. for 24 hours, thereby obtaining a polymer ( Polymer $R_1$ ) as an ivory powder.

The particle size of Polymer $R_1$ thus obtained was measured by an image analyzer ("OMNICON", trade mark; manufactured by Shimadzu Corp.). The average particle size was 10.6 $\mu$m. Particles not greater than 6$\mu$m amounted to 60.5 wt. %. On the other hand, particles of 30 $\mu$m and greater accounted for 0.4 wt. % only. The bulk density of Polymer $R_1$ was 0.24 g/dl. Incidentally, Tm of the polymer as polymerized was 362° C. Polymer $R_1$ thus obtained was soluble in 98% concentrated sulfuric acid but was insoluble in e-chloronaphthalene even at 225° C.

Comparative Example 2

(Experimental granulation by co- and re-dissolution of homopolymers)

A titanium-lined 1-l reactor was charged with 35 g of fine particulate PTK Polymer $R_1$ obtained in Comparative Example 1 and 65 g of poly(p-phenylene thioether) ("FORTRON #W214" trade mark, product of Kureha Chemical Industry Co., Ltd.) and further with 500 g of NMP and 45 g of water. The contents were maintained at 260° C. for 2 hours. After cooling, the resultant slurry was passed through a screen having an opening size of 75$\mu$m (200 mesh) to collect a particulate polymer. From the filtrate, a fine powdery polymer was also collected using a filter paper (class: 5A). The polymers thus collected were separately washed and dried in a similar manner to Example 1, thereby obtaining 51 g of granular Polymer $R_2$ and 37 g of fine powdery polymer.

As with poly(p-phenylene thioether), granular Polymer $R_2$ was insoluble in 98% concentrated sulfuric acid but soluble at 225° C. in $\alpha$-chloronaphthalene. Its transition temperature was substantially the same as that of poly(p-phenylene thioether). This indicates that when PTK and PATE are only heated together in a water-containing organic solvent, no reaction takes place between both homopolymers and hence, any copolymers can not be obtained.

Comparative Example 3

(Synthesis of random copolymer)

A titanium-lined 1-l reactor was charged with 0.4 mole of DCBP, 0.5 mole of hydrated sodium sulfide (water content: 54.0 wt. %), 0.1 mole of PDCB and 500 g of NMP. They were reacted at 260° C. for 2 hours [water content/NMP =5.0 mol/kg, DCBP/PDCB=87/13 (weight ratio)]. The reaction mixture in the form of slurry, said mixture containing Random Copolymer $R_3$, had a dark brown color and gave off an odor of decomposed polymers. As a result of a gas chromatographic analysis, the remaining monomer was founded to be PDCB. Its amount was equal to 33% of the amount charged. The slurry as the reaction mixture was passed through a screen having an opening size of 75 $\mu$m (200 mesh). It was however unable to collects any granular polymer.

This result indicates that DCBP and PDCB are substantially different from each other in reactivity and chemical stability in the polymerization system and hence extremely poor in copolymerizability with each other, so that any satisfactory copolymers can not be obtained therefrom.

Comparative Example 4

(Synthesis of random copolymer)

Polymerization was conducted in a similar manner to Comparative Example 3 except that 0.1 mole of DCBP and 0.4 mole of PDCB were charged in lieu of 0.4 mole of DCBP and 0.1 mole of PDCB [water content/NMP=5.0 mol/kg, DCBP/PDCB=30/70 (weight ratio)]. The reaction mixture in the form of slurry had a dark red color and gave off an offensive odor. The slurry was passed through a screen having an opening size of 75 $\mu$m (200 mesh). It was however unable to collect any granular polymer. A fine powdery polymer was recovered from the slurry by using a filter paper (class: 5A) and was then washed and dried in a similar manner to Example 1. Tm of the resulting Random Copolymer $R_4$ was 240° C., which was much lower than the melting points of poly(p-phenylene thioether) and PTK homopolymer.

As with Comparative Example 3, this indicates that DCBP and PDCB are substantially different from each other in reactivity and chemical stability in the polymerization system and hence extremely poor in copolymerizability with each other, so that any satisfactory copolymers can not be obtained therefrom.

Comparative Example 5

(Experimental formation of granules by re-dissolution of PTK)

A titanium-lined 1-l reactor was charged with 106 g of the fine powdery PTK polymer obtained in Comparative Example 1 and also with 500 g of NMP and 45 g of water. The contents were maintained at 260° C. for 2 hours. After cooling, the resultant slurry was passed through a screen having an opening size of 75 $\mu$m (200 mesh). It was however unable to collect any granular polymer.

Comparative Example 6

(Synthesis of PTK homopolymer)

A titanium-lined 1-l reactor was charged with 0.5 mole of DCBP, 0.5 mole of hydrated sodium sulfide (water content: 54.0 wt. %) and 500 g of NMP. After the reactor being purged with nitrogen, the resultant mixture was maintained at 260° C. for 2 hours to react them. The reactor was cooled, and the reaction mixture in the form of a slurry was passed through a screen having an opening size of 75 $\mu$m (200 mesh). It was however unable to collect any granular polymers.

Comparative Example 7 (Synthesis of block copolymer)

(Synthesis of PATE prepolymer)

A titanium-lined reactor was charged with 3.2 kg of hydrated sodium sulfide (water content: 53.7 wt. %) and 6.0 kg of NMP. While gradually heating the contents to 200° C. in a nitrogen gas atmosphere, 2.5 kg of an NMP solution, which contained 1.33 kg of water, and 0.401mole of hydrogen sulfide were distilled out. Thereafter, 0.12 kg of water was added. A liquid mixture consisting of 2.35 kg PDCB and 4.5 kg of NMP was then fed, followed by polymerization at 220° C. for 8 hours (PDCB/sodium sulfide=0.86 mol/mol; water content/NMP=about 3 mol/kg), whereby a reaction slurry containing a PATE prepolymer was obtained. The number-average molecular weight of the prepolymer was 1300 (average polymerization degree: 12).

(Synthesis of PTK prepolymer)

A titanium-lined 20-l reactor was charged with 3.640 moles of DCBP, 2.039 moles of hydrated sodium sulfide (water content: 53.7 wt. %), 176 g of water and 4,004 kg of NMP. After the reactor being purged with nitrogen, the contents were maintained at 220° C. for 1 hour to react them (water content/NMP=about 5 mol/kg), thereby obtaining a reaction slurry containing a PTK prepolymer.

With respect to Block Copolymer B1, a plurality of peaks corresponding to its melting points appear, and the peak width at half height is great. Regarding the copolymers according to this invention on the other hand, the peak corresponding to the melting point is single and sharp. This indicates that their uniformity in composition is excellent. Incidentally, the melt viscosity of Block Copolymer $B_1$ was 650 poises.

TABLE 1

| Poly-mer code | PATE recurring units/ PTK recurring units | | Transition temp. (°C.) | | Crystallinity melt stability | | | | Collection rate of polymer (%) Screen opening | | Collect-ability | Remark |
| | Charged value (weight ratio) | Analyzed value (weight ratio) | $Tg^{*1}$ | $Tm^{*1}$ | (400° C.) | | (400° C./ 10 min) | | 150 μm | 75 μm | | |
| | | | | | Tmc (°C.) | ΔHmc (J/g) | Tmc (°C.) | ΔHmc (J/g) | | | | |
|---|---|---|---|---|---|---|---|---|---|---|---|---|
| Ex. 1 | $C_1$ | 1.0 (50/50) | 1.0 (51/49) | 109 | 300 | 267 | 51 | 241 | 43 | 88 | — | Excellent | Production process No. 1 |
| Ex. 2 | $C_2$ | 0.5 (34/66) | 0.5 (34/66) | 114 | 324 | 282 | 47 | 260 | 30 | — | — | Good | Production process No. 1 |
| Ex. 3 | $C_3$ | 1.0 (50/50) | 1.0 (50/50) | 114 | 306 | 262 | 50 | 246 | 45 | 80 | — | Excellent | Production process No. 2 |
| Comp. Ex. 1 | $R_1$ | 0 (0/100) | Homopolymer | 135 | 351 | 320 | 60 | 313 | 55 | 0 | 0 | Poor | Fine powder |
| Comp. Ex. 2 | $R_2$ | 1.9 (65/35) | Blend | 86 (PATE) | 285 (PATE) | — | — | — | — | 58 | — | Good | PATE alone collected as granules |
| Comp. Ex. 3 | $R_3$ | 0.1 (11/89) | Trial for random copolymer (uncollectable) | — | — | — | — | — | — | 0 | 0 | Poor | Offensive odor. Poor copolymerizability |
| Comp. Ex. 4 | $R_4$ | 2.0 (67/33) | Trail for random copolymer | — | 295 | — | — | — | — | 0 | 0 | Poor | Offensive odor |
| Comp. Ex. 5 | $R_5$ | 0 (0/100) | Homopolymer | 140 | 351 | — | — | — | — | 0 | 0 | Poor | Fine powder |
| Comp. Ex. 7 | $B_1$ | 1.5 (60/40) | 1.5 (60/40) | 105 | 300/ 315*3 | 250 | 45 | 220 | 38 | 78 | — | Excellent | Block copolymer |
| Ref. Ex. | *2 | (100/0) | PATE homopolymer | 85 | 285 | 238 | 30 | 218 | 25 | — | — | — | Granular |

Note:
*1: Determined by DSC at a heating rate of 10° C./min by using a quench-pressed sheet (pressed at 380° C.) as a sample.
*2: "FORTRON #W214", trade mark; poly(p-phenylene thioether) produced by Kureha Chemical Industry Co., Ltd.
*3: A plurality of peaks corresponding to its melting points were observed.

(Synthesis of block copolymer)

A charge pot equipped with a heater was mounted on the titanium-lined 20-l reactor with the reaction slurry containing the PTK prepolymer (temperature of slurry: 220° C.). The pot was charged with 9.12 kg of the reaction slurry containing the PATE prepolymer. The PATE prepolymer-containing reaction slurry was heated to 220° C. and then added to the PTK prepolymer-containing reaction slurry. Further, 1.146 kg of water was added, and the contents were then mixed. The contents were maintained at 260° C. for 2 hours to react them. After the contents being allowed to cool down to 240° C., a final treatment of the reaction was conducted. The final stabilizing treatment of the reaction was effected by adding 0.4356 mole of DCBP and 0.5 kg of NMP and then reacting the contents at 240° C. for 0.2 hour.

(Collection of block copolymer)

Collection was conducted in a similar manner to Example 1, thereby obtaining Block Copolymer $B_1$. The collection rate was 78%.

(Physical properties of block copolymer)

The physical properties of Block Copolymer $B_1$ are shown in Table 1.

Example 4

(Solubility of polymers in solvent)

Copolymer $C_1$, Block Copolymer $B_1$ synthesized in Comparative Example 7, PTK Homopolymer $R_1$ synthesized in Comparative Example 1 and poly(p-phenylene thioether) ("FORTRON #W214" trade mark; product of Kureha Chemical Industry Co., Ltd.) were separately hot-pressed and then cooled to form amorphous sheets. The respective amorphous sheets were placed in the solvents shown in Table 2 to investigate their dissolution behavior.

As given in Table 2, Copolymer $C_1$ have solubility characteristics different from the PTK homopolymer and poly(p-phenylene thioether) which are homopolymers of the components of the copolymer, and the PATE-PTK block copolymer. After each of the polymers was dissolved in a p-chlorophenol/1,2,4-trichlorobenzene mixed solvent at 230° C., the sulfur content of the precipitate from the solution was determined. As a result, it was found that with respect to Copolymer $C_1$ according to this invention, there is no great difference between the original polymer before the dissolution and that precipitated from the solution. Regarding Block Copolymer $B_1$ on the other hand, the sulfur content of the precipitate was more than that of the original polymer before the dissolution by several percent. Namely, it is understood that Copolymer $C_1$ according to this invention is uniform in composition distribution compared with Block Copolymer $B_1$.

Tg: 112° C. (as to quench-pressed sheet)
Tm: 315° C. (as to polymer as polymerized)
Tm: 302° C. (as to quench-pressed sheet)
Melt crystallization temperature:
Tmc (400° C.): 260° C.

TABLE 2

| Solvent | 98% conc. sulfuric acid | d-Chloronaphthalene | | p-Chlorophenyl/1,2,4-trichlorobenzene mixed solvent (50/50 weight ratio) | | | |
|---|---|---|---|---|---|---|---|
| Dissolution temperature | Room temperature*1 | Room temperature | 225° C. | Room temperature | 220° C. | 230° C.*2 → room temp. | 230° C.*3 → 150° C. |
| Polymer Copolymer $C_1$ | ○ | X | ○ | X | ○ | Gradually precipitated | ○ |
| Block Copolymer $B_1$ | X | X | X | X | ○ | Precipitated | ○ |
| PTK Homopolymer $R_1$ | ○ | X | X | X | ○ | ○ | ○ |
| Poly(p-phenylene thioether) | X | X | ○ | X | ○ | X | X |

X: Insoluble, ○: Soluble.
*1State when a solubilizing operation was conducted at room temperature for 30 minutes.
*2State when maintained at room temperature for 2 hours after a solubilizing operation was conducted at 230° C. for 30 minutes.
*3State when maintained at 150° C. for 1 hours after a solubilizing operation was conducted at 230° C. for 30 minutes.

Example 5

(Production Process No. 1)

(Synthesis of PATE oligomer)

A titanium-lined reactor was charged with 127.9 g of hydrated sodium sulfide (water content: 39.13 wt. %), 110.2 g of PDCB, 3.0 g of sodium hydroxide and 500 g of NMP. After the reactor being purged with nitrogen gas, the contents were heated to react them at 230° C. for 4 hours and then at 240° C. for 2 hours (PDCB/sodium sulfide=0.75 mol/mol; water content/NMP=5.6 mol/kg), thereby obtaining a reaction slurry (Slurry $S_5$) containing an oligomer (oligomer $P_5$) of PPTE. The amount of PDCB remaining in the reaction slurry was lower than 0.1 wt. %. The number-average polymerization degree of Oligomer $P_5$ was 8.

(Synthesis of copolymer)

A titanium-lined reactor was charged with 488 g of the resulting Reaction Slurry $S_5$, 63.4 g of DCBP, 278 g of NMP, 18.9 g of water and 16.4 g of hydrated sodium sulfide (water content: 53.98 wt. %). After the reactor being purged with nitrogen gas, the contents were heated to 265° C. at which they were reacted for 0.5 hour. After the contents being allowed to cool down to 240° C., a final treatment of the reaction was conducted. The final stabilizing treatment of the reaction was effected by putting under pressure a mixture of 7.5 g of DCBP, 43 g of NMP and 4.3 g of water in the reaction mixture to react them at 240° C. for 0.5 hour. The reaction conditions upon synthesis of the copolymer were as follows:

(1) The molar ratio of the total amount of the charged dihalogenated aromatic compound to the total amount of the charged alkali metal sulfide was 0.99.

(2) The molar ratio of the amount of the charged PDCB to the amount of the charged DCBP was 2.

(3) The ratio of the water content to the amount of the charged NMP was 5.6 mol/kg.

(Collection of copolymer)

Collection was conducted in the same manner as in Example 1, thereby obtaining a copolymer (Copolymer $C_5$). The collection rate was 70% when recovered by means of a screen having an opening size of 150 μm.

(Physical properties of copolymer)

The physical properties of Copolymer $C_5$ were as follows:

Melt viscosity: 70 poises
Transition temperature:

Tmc (400° C./10 min): 220° C.
Melt crystallization enthalpy: ΔHmc (400° C.): 47 J/g
Residual melt crystallization enthalpy: ΔHmc (400° C./10 min): 31 J/g Incidentally, the weight ratio of the sum of PATE recurring units to the sum of PTK recurring units was 0.99.

Example 6 (Production Process No. 2)

(Synthesis of PATE oligomer)

A reaction slurry (Slurry $S_6$) containing a PPTE oligomer (Oligomer $P_6$, number-average polymerization degree: 8) was obtained in a similar manner to Example 5.

(Synthesis of PTK oligomer)

A titanium-lined reactor was charged with 101.6 g of DCBP, 4.0 g of hydrated sodium sulfide (water content: 53.78 wt. %), 42.6 g of water and 444 g of NMP. After the reactor being purged with nitrogen gas, the contents were heated to 220° C. at which they were reacted for 1 hour (water content/NMP=5.6 mol/kg) to obtain a reaction slurry (Slurry $KS_6$) containing a PTK oligomer (Oligomer $K_6$). A portion of Reaction Slurry $KS_6$ was treated in the same manner as in Example 3 to determine the reduced viscosity of the oligomer sample. The reduced viscosity was extremely low and the value was lower than 0.05 dl/g.

(Synthesis of copolymer)

A titanium-lined reactor was charged with 587.0 g of Reaction Slurry $S_6$ and 296.1 g of Reaction Slurry $KS_6$. After the reactor being purged with nitrogen, the contents were heated to 265° C. at which they were reacted for 0.5 hour.

After the contents being allowed to cool down to 240° C., a final treatment of the reaction was conducted. The final stabilizing treatment of the reaction was effected by putting under pressure a mixture of 8.0 g of DCBP, 46 g of NMP and 4.6 g of water in the reaction mixture to react them at 240° C. for 0.5 hour. The reaction conditions upon synthesis of the copolymer were as follows:

(1) The molar ratio of the total amount of the charged dihalogenated aromatic compound to the total amount of the charged alkali metal sulfide was 0.99.

(2) The molar ratio of the amount of the charged PDCB in the first step to the amount of the charged DCBP in the second step was 2.9.

(3) The ratio of the water content to the amount of the charged NMP was 5.6 mol/kg.

(Collection of copolymer)

Collection was conducted in the same manner as in Example 1, thereby obtaining a copolymer (Copolymer $C_6$). The collection rate was 71% when recovered by means of a screen having an opening size of 150 μm.

(Physical properties of copolymer)

The physical properties of Copolymer $C_6$ were as follows:
Melt viscosity: 90 poises
Transition temperature:
  Tg: 102° C. (as to quench-pressed sheet)
  Tm: 297° C. (as to polymer as polymerized)
  Tm: 294° C. (as to quench pressed sheet)
Melt crystallization temperature:
  Tmc (400° C.): 261° C.
  Tmc (400° C./10 min): 214° C.
Melt crystallization enthalpy:
  ΔHmc (400° C.): 54 J/g
Residual melt crystallization enthalpy:
  ΔHmc (400° C./10 min): 42 J/g Incidentally, the weight ratio of the sum of PATE recurring units to the sum of PTK recurring units was 1.5.

Example 7 (Production Process No. 2)

(Synthesis of PATE oligomer)

A titanium-lined reactor was charged with 127.9 g of hydrated sodium sulfide (water content: 39.13 wt. %), 110.2 g of PDCB, 3.0 g of sodium hydroxide and 500 g of NMP. After the reactor being purged with nitrogen gas, the contents were heated to react them at 230° C. for 6 hours and then at 240° C. for 2 hours (PDCB/sodium sulfide=0.75 mol/mol; water content/NMP=5.6 mol/kg), thereby obtaining a reaction slurry (Slurry $S_7$) containing a PPTE oligomer (Oligomer $P_7$). The amount of PDCB remaining in the reaction slurry was lower than 0.1 wt. %.

The number-average polymerization degree of Oligomer $P_7$ was 8.

(Synthesis of PTK oligomer)

A titanium-lined reactor was charged with 126.8 g of DCBP, 32.2 g of hydrated sodium sulfide (water content: 53.98 wt. %), 38.2 g of water and 556 g of NMP. After the reactor being purged with nitrogen gas, the contents were heated to 220° C. at which they were reacted foril hour (water content/NMP=5.6 mol/kg) to obtain a reaction slurry (Slurry $KS_7$) containing a PTK oligomer (Oligomer $K_7$). A portion of Reaction Slurry $KS_7$ was treated in the same manner as in Example 3 to determine the reduced viscosity of the oligomer sample. The reduced viscosity was extremely low and the value was lower than 0.05 dl/g.

(Synthesis of copolymer)

A titanium-lined reactor was charged with 488.0 g of Reaction Slurry $S_7$ and 376.8 g of Reaction Slurry $KS_7$. After the reactor being purged with nitrogen, the contents were heated to 265° C. at which they were reacted for 0.5 hour. After the contents being allowed to cool down to 240° C., a final treatment of the reaction was conducted. The final stabilizing treatment of the reaction was effected by putting under pressure a mixture of 7.5 g of DCBP, 42.8 g of NMP and 4.3 g of water in the reaction mixture to react them at 240° C. for 0.5 hour. The reaction conditions upon synthesis of the copolymer were as follows:

(1) The molar ratio of the total amount of the charged dihalogenated aromatic compound to the total amount of the charged alkali metal sulfide wag 0.99.

(2) The molar ratio of the amount of the charged PDCB in the first step to the amount of the charged DCBP in the second step was 2.0.

(3) The ratio of the water content to the amount of the charged NMP was 5.6 mol/kg.

(Collection of copolymer)

Collection was conducted in the same manner as in Example 1, thereby obtaining a copolymer (Copolymer $C_7$). The collection rate was 73% when recovered by means of a screen having an opening size of 150 μm.

(Physical properties of copolymer)

The physical properties of Copolymer $C_7$ were as follows:
Melt viscosity: 90 poises
Transition temperature:
  Tg: 110° C. (as to quench-pressed sheet)
  Tm: 314° C. (as to polymer as polymerized)
  Tm: 302° C. (as to quench-pressed sheet)
Melt crystallization temperature:
  Tmc (400° C.): 266° C.
  Tmc (400° C./10 min): 224° C.
Melt crystallization enthalpy:
  ΔHmc (400° C.): 52 J/g
Residual melt crystallization enthalpy:
  ΔHmc (400° C./10 min): 38 J/g Incidentally, the weight ratio of the sum of PATE recurring units to the sum of PTK recurring units was 0.99.

Example 8

(Production Process No. 2)

(Synthesis of PATE oligomer)

Reaction Slurry $S_1$ containing PPTE Oligomer $P_1$, which had been prepared in Example 1 was used.

(Synthesis of PTK oligomer)

A titanium-lined 20-1 reactor was charged with 1140.3 g of DCBP, 144.8 g of hydrated sodium sulfide (water content: 53.9 wt. %), 371.5 g of water and 4995 g of NMP. After the reactor being purged with nitrogen, the contents were maintained at 220° C. for 1 hour to react them (water content/NMP=5 mol/kg), thereby obtaining a reaction slurry containing a PTK oligomer.

A portion of the reaction slurry thus obtained was treated in the same manner as in Example 3 to determine the reduced viscosity of the oligomer sample. The reduced viscosity was extremely low and the value was lower than 0.05 dl/g.

(Synthesis of copolymer)

A charge pot equipped with a heater was mounted on the titanium-lined reactor with the reaction slurry containing the PTK oligomer (temperature of slurry: 180° C.). The pot was charged with 9039 g of the reaction slurry containing the PATE oligomer. The PATE oligomer-containing reaction slurry was heated to 180° C. and then added to the PTK oligomer-containing reaction slurry. Further, 1242 g of water was added, and the contents were then mixed.

The contents were maintained at 265° C. for 30 minutes to react them. After the contents being allowed to cool down to 240° C., a final treatment of the reaction was conducted. The final stabilizing treatment of the reaction was effected by adding 137 g of DCBP and 776 g of NMP and then reacting the contents at 240° C. for 30 minutes. The reaction conditions upon synthesis of the copolymer were as follows:

(1) The molar ratio of the total amount of the charged dihalogenated aromatic compound to the total amount of the charged alkali metal sulfide was 0.99.

(2) The molar ratio of the amount of the charged PDCB to the amount of the charged DCBP was 2.0.

(3) The ratio of the water content to the amount of the charged NMP was 10 mol/kg.

(Collection of copolymer)

Collection was conducted in the same manner as in Example 3, thereby obtaining a copolymer (Copolymer $C_8$). The collection rate was 82%.

(Physical properties of copolymer)

The physical properties of Copolymer $C_8$ were as follows:

Melt viscosity: 250 poises

Transition temperature:
  Tg: 112° C. (as to quench-pressed sheet)
  Tm: 313° C. (as to polymer as polymerized)
  Tm: 297° C. (as to quench-pressed sheet)

Melt crystallization temperature:
  Tmc (400° C.): 265° C.
  Tmc (400° C./10 min): 234° C.

Melt crystallization enthalpy:
  ΔHmc (400° C.): 49 J/g

Residual melt crystallization enthalpy:
  ΔHmc (400° C./10 min): 38 J/g

Incidentally, the weight ratio of the sum of PATE recurring units to the sum of PTK recurring units was 1.0.

Example 9

(Production Process No. 1)

(Synthesis of PATE oligomer)

A titanium-lined reactor was charged with 127.9 g of hydrated sodium sulfide (water content: 39.13 wt. %), 103 g of PDCB, 3.0 g of sodium hydroxide, 20 g of water and 700 g of NMP. After the reactor being purged with nitrogen gas, the contents were heated to react them at 230° C. for 4 hours and at 240° C. for 2 hours (PDCB/Sodium sulfide=0.70 mol/mol; water content/NMP=5.6 mol/kg), thereby obtaining a reaction slurry (Slurry $S_9$) containing Oligomer $P_9$. The number-average polymerization degree of Oligomer $P_9$ was 7. The amount of PDCB remaining in the reaction slurry was lower than 0.1 wt. %.

(Synthesis of copolymer)

A titanium-lined reactor was charged with 477 g of Reaction Slurry $S_9$ thus obtained and 36.2 g of DCBP. After the reactor being purged with nitrogen gas, the contents were heated to 265° C. at which they were reacted for 0.5 hour (water content/NMP=5.6 mol/kg).

After the contents being allowed to cool down to 240° C., a final treatment of the reaction was conducted. The final stabilizing treatment of the reaction was effected by putting under pressure a mixture of 5.0 g of DCBP and 40 g of NMP in the reaction mixture to react them at 240° C. for 0.5 hour. The reaction conditions upon synthesis of the copolymer were as follows:

(1) The molar ratio of the total amount of the charged dihalogenated aromatic compound to the total amount of the charged alkali metal sulfide was 0.99.

(2) The molar ratio of the amount of the charged PDCB to the amount of the charged DCBP was 2.4.

(3) The ratio of the water content to the amount of the charged NMP was 5.6 mol/kg.

(Collection of copolymer)

Collection was conducted in the same manner as in Example 1, thereby obtaining a copolymer (Copolymer $C_9$). The collection rate was 78% when recovered by means of a screen having an opening size of 150 μm.

(Physical properties of copolymer)

The physical properties of Copolymer $C_9$ were as follows:

Melt viscosity: 100 poises

Transition temperature:
  Tg: 106° C. (as to quench-pressed sheet)
  Tm: 301° C. (as to polymer as polymerized)
  Tm: 296° C. (as to quench-pressed sheet)

Melt crystallization temperature:
  Tmc (400° C.): 269° C.
  Tmc (400° C./10 min): 220° C.

Melt crystallization enthalpy:
  ΔHmc (400° C.): 55 J/g

Residual melt crystallization enthalpy:
  ΔHmc (400° C./10 min): 43 J/g

Incidentally, the weight ratio of the sum of PATE recurring units to the sum of PTK recurring units was 1.2.

We claim:

1. A process for the production of a poly(arylene thioether-ketone) copolymer comprising (A) at least one poly(arylene thioether-ketone) segment and (B) at least one poly(arylene thioether) segment, which comprises at least the following three steps:

i) heating in the presence of water an organic amide solvent containing a dihalogenated aromatic compound, which consists principally of a dihalobenzene, and an alkali metal sulfide, whereby a poly(arylene thioether) oligomer having at least 50 wt. % recurring units of the formula

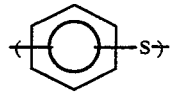

and at least one terminal thiolate group is synthesized, ii) heating in the presence of water an organic amide solvent containing a dihalogenated aromatic compound, which consists principally of at least one dihalobenzophenone selected from 4,4'-dichlorobenzophenone and 4,4'-dibromobenzophenone, and an alkali metal sulfide, whereby a poly(arylene thioether-ketone) oligomer having at least 50 wt. % recurring units of the formula

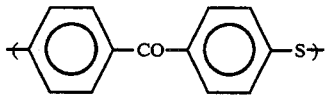

wherein the —CO— and —S— are in the para position to each other, and terminal halogen atoms is synthesized, and iii) mixing and reacting the poly(arylene thioether) oligomer, which has been obtained in the step i), with poly(arylene thioether-ketone) oligomer obtained in the step ii) and optionally, water;

said first through third steps i)–iii) being conducted under the following conditions (a)–(g):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.3–0.9 (mol/mol), and the polymerization being conducted until the number-average polymerization degree of the poly(arylene thioether) oligomer becomes higher than 1 but lower than 10, (b) in the second step ii), the ratio of the water content to the amount of the charged organic amide solvent being controlled within a range of 0.1–15 (mol/kg) and the reaction being conducted within a temperature range of 60°–300° C. with the proviso that the reaction time at 210° C. and higher is not longer than 10 hours, (c) in the third step iii), the ratio of the water content to the amount of the charged organic amide solvent being 0.1–15 (mol/kg), (d) in the third step iii), the ratio of the total amount of the charged dihalogenated aromatic compound, said total amount being the amount of the whole dihalogenated aromatic compounds including the dihalobenzene and the dihalobenzophenone, to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the charged amount of the dihalogenated aromatic compound consisting principally of the dihalobenzene in the step i) to the charged amount of the dihalogenated aromatic compound consisting principally of the dihalobenzophenone in the step ii) being controlled within a range of 0.1–10 (mol/mol), (f) the reaction of the third step iii) being conducted within a temperature range of 150°–300° C. with the proviso that the reaction time at 210° C. and higher is not longer than 10 hours, and (g) in the third step iii), the reaction being conducted until the melt viscosity of the resulting copolymer becomes 2–100,000 poises as measured at 350° C. and a shear rate of 1,200/sec.

2. The process as claimed in claim 1, wherein the poly(arylene thioether) oligomer has at least 50 wt. % recurring units of the formula

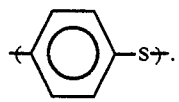

3. The process as claimed in claim 1, wherein in each of the steps i) through iii), the reaction is conducted in a reactor at least a portion of which, said portion being brought into contact with the reaction mixture, is made of a corrosion-resistant material.

4. The process as claimed in claim 3, wherein the corrosion-resistant material is a titanium material.

5. The process as claimed in claim 1, wherein the organic amide solvent is at least one pyrrolidone selected from N-methylpyrrolidone and N-ethylpyrrolidone.

6. The process as claimed in claim 1, wherein upon obtaining the poly(arylene thioether-ketone) copolymer, at least 50 wt. % of the resulting copolymer is in the form of granules recoverable on a sieve having an opening size of 75 μm.

* * * * *